UNITED STATES PATENT OFFICE.

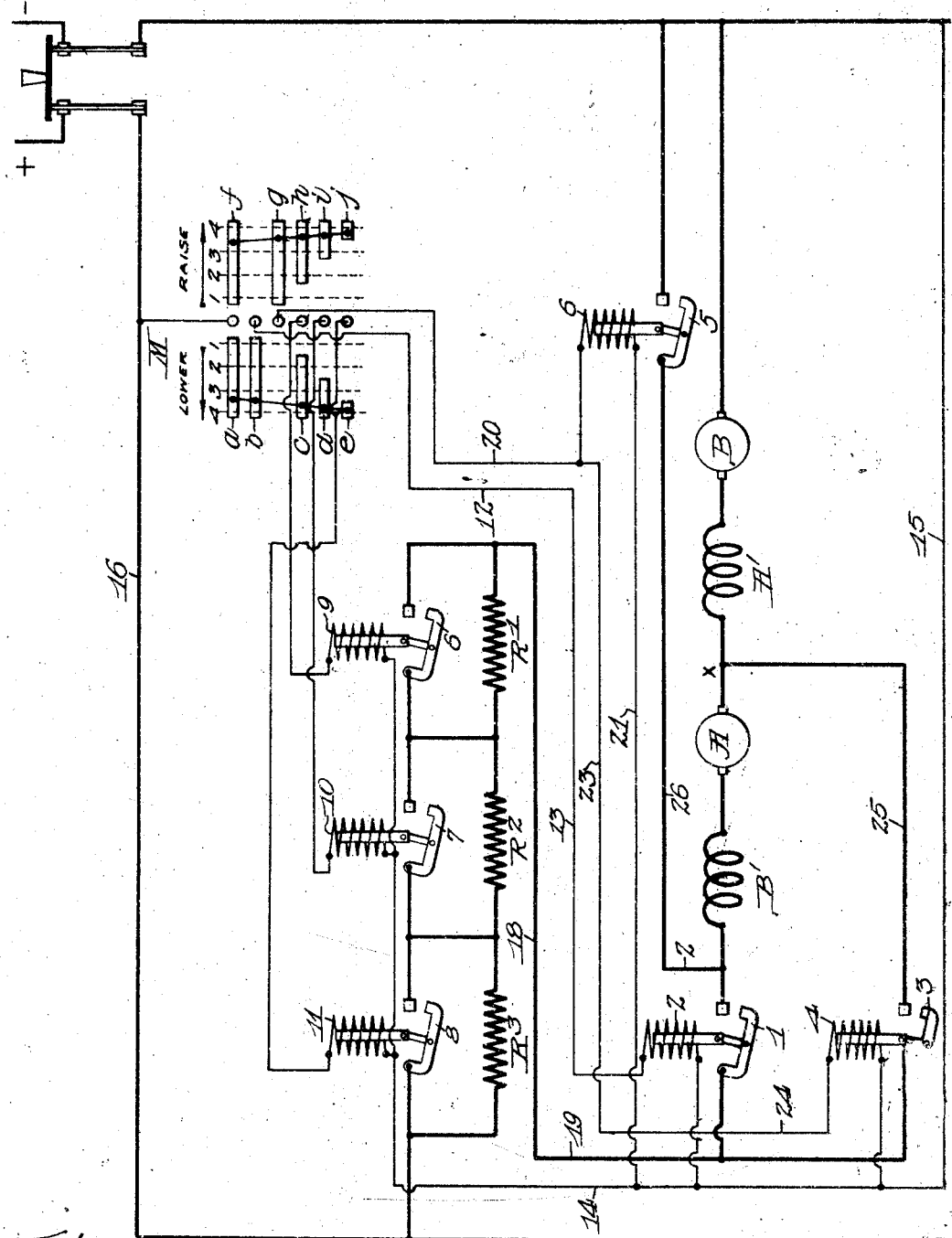

CLARK T. HENDERSON, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

994,080.  Specification of Letters Patent.  Patented May 30, 1911.

Application filed October 17, 1908. Serial No. 458,266.

*To all whom it may concern:*

Be it known that I, CLARK T. HENDERSON, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

My invention relates to improvements in motor controllers, and particularly to controllers which are employed for operating motors in series parallel relation.

There are instances in practice where it would be advantageous to connect two motors in series and run them in one direction, and then connect the motors in parallel and run them in the reverse direction. For example: It is desirable to operate the motors in this manner on screw downs for rolling mills. In such machines the rolls should be moved down in very small increments, but should be raised as rapidly as practicable after the rolling operation is completed, so as to save time. It has been difficult to use series parallel control upon screw downs since the advent of magnetically operated controllers, owing to the fact that a large number of electromagnetically operated switches would be required in order to reverse the motors and change their electrical relation.

The object of the present invention is to provide a structure wherein the number of switches required to control the series parallel relation and the direction of operation of the motors will be less than has heretofore been required.

In order to more fully set forth the nature of my invention, I have diagrammatically illustrated, in the accompanying drawing, the general principles of my controller.

The drawing merely illustrates the control in a schematic way. In practice various devices, in addition to those which I have illustrated, would be employed, and the structure, as a whole, would be elaborated, but I have deemed it better to eliminate these things in my application, as they are well understood in the art and would only tend to complicate the disclosure of the principal features of my invention. The drawing should, therefore, be construed in an illustrative sense and not in a limiting manner.

For the purpose of illustration I have shown two motors, one having armature A and series field A', and the other having armature B and series field B'. These armatures and fields are connected electrically in a suitable manner. The armature of one motor and the field of the other preferably being arranged on one side of a given point, and the other armature and field being arranged on the opposite side of said point. A switch, 1 actuated by solenoid 2, serves to connect the motors across the line in series relation. A switch 3, actuated by solenoid 4, serves to connect the motor across the line in parallel and to reverse the relative polarity of each motor to run the motors in a reverse direction. The switch 3 serves to connect point X to one side of the line. The switch 5 serves to connect the armature A and the field B' to the other side of the line in parallel with the armature B and field A', which are connected between the point X and the other side of the line. Hence the relative polarity of the field and armature of each motor is, therefore, reversed, thereby reversing the operation of the motor. For the purpose of accelerating the motors, resistances $R^1$, $R^2$ and $R^3$ are provided, which are controlled by switches 6, 7 and 8, which switches are actuated respectively by solenoids 9, 10 and 11.

The operation of the various switches which have been described is directed by means of a master switch M, which switch is assumed to be of the drum type, and development of the contacts of the master switch, is shown in the drawing. On one side of the drum are segments $a$, $b$, $c$, $d$ and $e$, and on the other side segments $f$, $g$, $h$, $i$ and $j$; between the right and left hand segments are shown the contact fingers which are engaged thereby when the master controller is moved. If the master controller be moved so that the left hand segments engage the fingers, the rolls will be lowered, and if it be moved so that the right hand segments engage the fingers the rolls will be raised.

I shall now describe the operation of the system. Let it be assumed that it is desired to lower the rolls. Accordingly the controller is moved to bring the left hand segments into engagement with their respective contact fingers. The master controller has four positions on each side of its central position, which positions are indicated by dotted lines. When the controller is in the first left hand position the segment $b$ engages its contact finger as well as segment $a$; accordingly switch 1 is closed as circuit is closed from the positive line through segments $a$, $b$, conductor 12, conductor 13, solenoid 2, conductor 14, conductor 15, to the negative line. Switch 1 connects the motors in series. The motor circuit now extends from positive line through conductor 16, conductor 17, resistances $R^3$, $R^2$, $R^1$, conductor 18, conductor 19, switch 1, field B′, armature A, field A′, armature B, to the negative line. As the master controller is moved to the second, third and fourth positions, switches 6, 7 and 8 are closed respectively, thereby short-circuiting resistances $R^1$, $R^2$ and $R^3$, speeding up the motor. The circuits of solenoids 9, 10 and 11 extend from segments $c$, $d$ and $e$, through said solenoids in parallel and thence through conductor 14 and conductor 15 to the negative line. When the rolls have been lowered to the desired degree, the motors may be stopped by returning the master controller to the off position. In order to raise the rolls the master controller is moved to bring the right hand segments into engagement with their respective fingers to thereby reverse the motors and connect them in parallel relation so that the same will raise the rolls rapidly. When the controller is in the first right hand position, switches 3 and 5 are closed, the circuits of the operating windings 4 and 6 thereof being closed by the segment $g$. The circuit of solenoid 6 extends from segment $g$ through conductor 20, solenoid 6, conductor 21 and conductors 14 and 15, to the negative line. The circuit of solenoid 4 extends from segment $g$ through conductor 20, conductor 23, conductor 24, solenoid 4 and conductor 15, to the negative line. The motor circuit now extends from the positive line through conductor 16 and conductor 17, resistances $R^3$, $R^2$ and $R^1$, conductor 18, conductor 19, switch 3 and conductor 25, to the point X, where it divides. The armature A and the field B′ are connected between the point X and the negative line by switch 5, the circuit extending from point X through armature A, field B′, conductor 26, switch 5, to the negative line. This field A′ and the armature B are connected between the point X and the negative line; hence the armature A and the field B′ are connected in parallel with the field A′ and the armature B, and also the relative polarity of the armature and field of each motor is reversed so that the motors will run in a reverse direction and raise the rolls. It will thus be seen that by means of a very simple circuit arrangement, which requires a minimum number of switches, I am able to reverse the motors and run them in parallel relation as the master controller is moved to the second, third and fourth positions. On the right the switches 6, 7 and 8, operate in the manner previously described, thereby removing resistances $R^1$, $R^2$ and $R^3$ from circuit and speeding up the motors.

It will, of course, be obvious that the principles of my invention may be applied to various different structures, all of which fall within the purview of the claims appended hereto.

What I claim as new and desire to secure by Letters Patent is:—

1. In a controller for a plurality of motors, means for connecting said motors in series, and other means for connecting said motors in parallel and inherently reversing the operation thereof.

2. In a motor controller for a plurality of motors, means for connecting the motors in series, other means for connecting said motors in parallel and reversing the direction of operation thereof simultaneously, and means for varying a controlling resistance for the motors.

3. In a controller for a plurality of motors, a switch for connecting the motors in series relation, two other switches for connecting the motors in parallel relation and insuring reversal of the relative polarity of the armature and field of each motor.

4. In a controller for a plurality of motors, a switch for connecting the motors in series relation, two other switches for connecting the motors in parallel relation and reversing the relative polarity of the armature and field of each motor, and resistance controlling switches.

5. In a controller for a plurality of motors, a switch for connecting the motors in series relation, two other switches for connecting the motors in parallel relation and reversing the relative polarity of the armature and field of each motor, and resistance controlling switches, and a master switch for directing the operation of all of said switches.

6. In a motor controller in combination, means for connecting the motors in series relation and switches for connecting the armature of one motor and the field of the other in one branch circuit, and the other armature and the other field in another branch circuit to reverse the motors and run them in parallel relation.

7. In a controller for a plurality of motors, means for connecting the motors in series relation, the armature of one motor and the field of the other being arranged on one side of a given point, and the other armature and the other field being arranged on the other side of said point and connected to one side of the source of supply whereby the motors may be connected in parallel and the relative polarity of the armature and field of each motor may be reversed to run the motors in a reverse direction.

8. In a motor controller for a plurality of motors, in combination, a switch for connecting the motors in series relation, the armature of one motor and the field of the other being arranged on one side of a given point, and the other armature and the other field being arranged on the opposite side of said point; a switch for connecting said point to one side of the source of supply, another switch for connecting the first mentioned armature and field between said point and the other side of the source of supply, whereby the motors will be connected in parallel and run in a reverse direction.

9. In a motor controller for a plurality of motors, in combination, a switch for connecting the motors in series relation, the armature of one motor and the field of the other being arranged on one side of a given point, and the other armature and the other field being arranged on the opposite side of said point; a switch for connecting said point to one side of the source of supply, another switch for connecting the first mentioned armature and field between said point and the other side of the source of supply, whereby the motors will be connected in parallel and run in a reverse direction, and resistance controlling switches for said motors.

10. In a motor controller for a plurality of motors, in combination, a switch for connecting the motors in series relation, the armature of one motor and the field of the other being arranged on one side of a given point, and the other armature and the other field being arranged on the opposite side of said point; a switch for connecting said point to one side of the source of supply, another switch for connecting the first mentioned armature and field between said point and the other side of the source of supply, whereby the motors will be connected in parallel and run in a reverse direction, and resistance controlling switches for said motors, and a master switch for directing the operation of said switches.

11. A controller for a plurality of electric motors, comprising an electromagnetically operated switch for connecting the motors in series, the armature of one motor and the field of the other motor being arranged on one side of a given point, and the other field and armature being arranged on the opposite side of said point, and an electromagnetically operated switch for connecting said point to one side of the source of supply, another electromagnetically operated switch for connecting the first mentioned armature and field to the other side of the source of supply, and electromagnetically operated switches for controlling resistance arranged in circuit with said motors, and a master switch for directing the operation of said switches.

12. A controller for a plurality of motors, comprising three single pole switches adapted to be operated to connect the motors in either series or parallel relation and to insure the reversal of the motors when connected in parallel.

13. A controller for a plurality of motors, comprising three single pole switches adapted to be operated to connect the motors in series to operate in one direction and to establish parallel connections for the motors which will insure a reversal in polarity of the field or armature of each motor to cause the motors when connected in parallel to operate in an opposite direction.

14. In a controller for a plurality of electric motors, in combination, means for connecting the motors in series to cause the same to operate in one direction and other means for connecting the motors in parallel, the parallel connections being such as to inherently cause the motors to operate in a reverse direction to that in which they operate when connected in series.

15. A controller for a plurality of motors comprising means for connecting the motors either in series or in parallel relation with the field of each motor in series with the armature of another motor, the parallel connections being such as to insure operation of the motors in an opposite direction to that in which they operate when connected in series.

16. In a controller for a plurality of electric motors, in combination, means for connecting the motors in series to operate in one direction and two single pole switches for connecting the motors in parallel and reversing the operation thereof.

In witness whereof, I have hereunto subscribed my name in the presence of two witnesses.

CLARK T. HENDERSON.

Witnesses:
F. S. WILLIOTT,
S. W. FITZGERALD.